United States Patent [19]

Chopko et al.

[11] Patent Number: 4,899,550
[45] Date of Patent: Feb. 13, 1990

[54] REFRIGERATION UNIT AND HYDRAULIC POWER SYSTEM

[75] Inventors: Robert A. Chopko, Liverpool, N.Y.; Joel W. Androff, Rowland Heights, Calif.

[73] Assignee: Carrier Corporation, Syracuse, N.Y.

[21] Appl. No.: 220,646

[22] Filed: Jul. 18, 1988

[51] Int. Cl.⁴ ............................................. F25B 27/00
[52] U.S. Cl. ..................... 62/163; 62/196.2; 62/228.5; 62/239; 62/323.4; 414/545
[58] Field of Search ............. 62/163, 228.5, 239, 62/323.1, 323.4, 196.1, 196.2, 196.3, 243, 244, 133, 239; 165/42, 41, 43; 414/545

[56] References Cited

U.S. PATENT DOCUMENTS

| | | | |
|---|---|---|---|
| 3,052,103 | 9/1962 | Clark, Jr. ................. | 62/323.4 X |
| 3,236,060 | 2/1966 | Clark, Jr. ................. | 62/323.4 X |
| 4,068,477 | 1/1978 | Lefebvre ................. | 62/323.4 X |
| 4,327,558 | 5/1982 | Howland et al. ......... | 62/196.2 X |
| 4,688,391 | 8/1987 | Chopko et al. .......... | 62/163 |
| 4,763,487 | 8/1988 | Wicks ..................... | 62/239 |

Primary Examiner—Harry B. Tanner
Attorney, Agent, or Firm—David J. Zobkiw

[57] ABSTRACT

A transport refrigeration system is connected to a hydraulic system including a pump, control valves, a reservoir and a hydraulic device. When the refrigeration system is running, the hydraulic system is disabled and the diesel and compressor are run responsive to cargo refrigeration requirements. When the hydraulic system is activated, the diesel is caused to operate at a preselected speed for maximum hydraulic flow and the refrigeration electrical, if necessary, system unloads the compressor to divert more engine power to the hydraulic pump.

7 Claims, 3 Drawing Sheets

REFRIGERATION UNIT AND HYDRAULIC POWER SYSTEM

BACKGROUND OF THE INVENTION

Trailers with refrigeration units are typically used to ship and deliver frozen and/or perishable cargos. The refrigeration unit is generally mounted on the front outer wall of the trailer to maximize cargo space and includes a diesel engine for powering the refrigeration unit. In the loading and unloading of the cargo, a lift gate or platform is typically used to raise and lower the load. The lift gate or platform is operated through a hydraulic system. As disclosed in commonly assigned U.S. Pat. No. 4,688,391, the hydraulic system can be driven by the same power source as the refrigeration unit by unloading the refrigeration compressor responsive to the actuation of the hydraulic system. Both the pump and compressor are thus always driven but at least one is always in an unloaded or idled state. In the case of the hydraulic system, the hydraulic fluid is warmed by its continuing circulation through the pump. So, in addition to the energy loss due to driving the pump, even though it is unloaded, there is a requirement for a larger hydraulic fluid supply and reservoir in order to offset the heating effects of constant circulation through the pump. Also, this embodiment unloads the compressor whether required or not. The prime mover may be able to drive both the refrigeration unit and hydraulic system under some or all conditions. Where the cargo is made up of frozen, perishable and non-refrigerated items, each compartment may have its own lift gate or platform.

SUMMARY OF THE INVENTION

A hydraulic power system is directly driven by the diesel engine driving the compressor of the refrigeration unit and means are provided so that the compressor driving means is unloaded, if necessary, when the hydraulic power system is activated. The hydraulic power system is attached to the framework of the refrigeration unit so as to form an integral unit therewith. The resultant unit eliminates the need for auxiliary batteries while providing a suitable power source for the hydraulic power system and permits the locating of the hydraulic power system in a location less exposed to road hazards. The refrigeration requirements of the cargo are therefore met and control the diesel power source unless the hydraulic system is actuated and requires the unloading of the compressor.

It is an object of this invention to provide a combined refrigeration and hydraulic power system for transport trailer use.

It is another object of this invention to provide a reliable power source for a hydraulic power system.

It is a further object of this invention to provide a combined refrigeration and hydraulic power system where the refrigeration compressor driving means is unloaded responsive to hydraulic power system requirements. These objects, and others as will become apparent hereinafter, are accomplished by the present invention.

Basically, a diesel engine is connected so as to drive the compressor of the transport refrigeration unit and the pump of the hydraulic power system. Normally, the compressor is driven responsive to refrigeration requirements and the diesel engine speed is controlled responsive to system needs with the compressor being unloaded when the needs are met. When it is desired to operate the hydraulic system, a manual switch is actuated. If the diesel engine is capable of powering both hydraulic system and the refrigeration unit then the compressor is run responsive to system demands. Otherwise, the compressor is unloaded or disengaged from the diesel engine when the hydraulic power system is actuated.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENT

Figure 1:
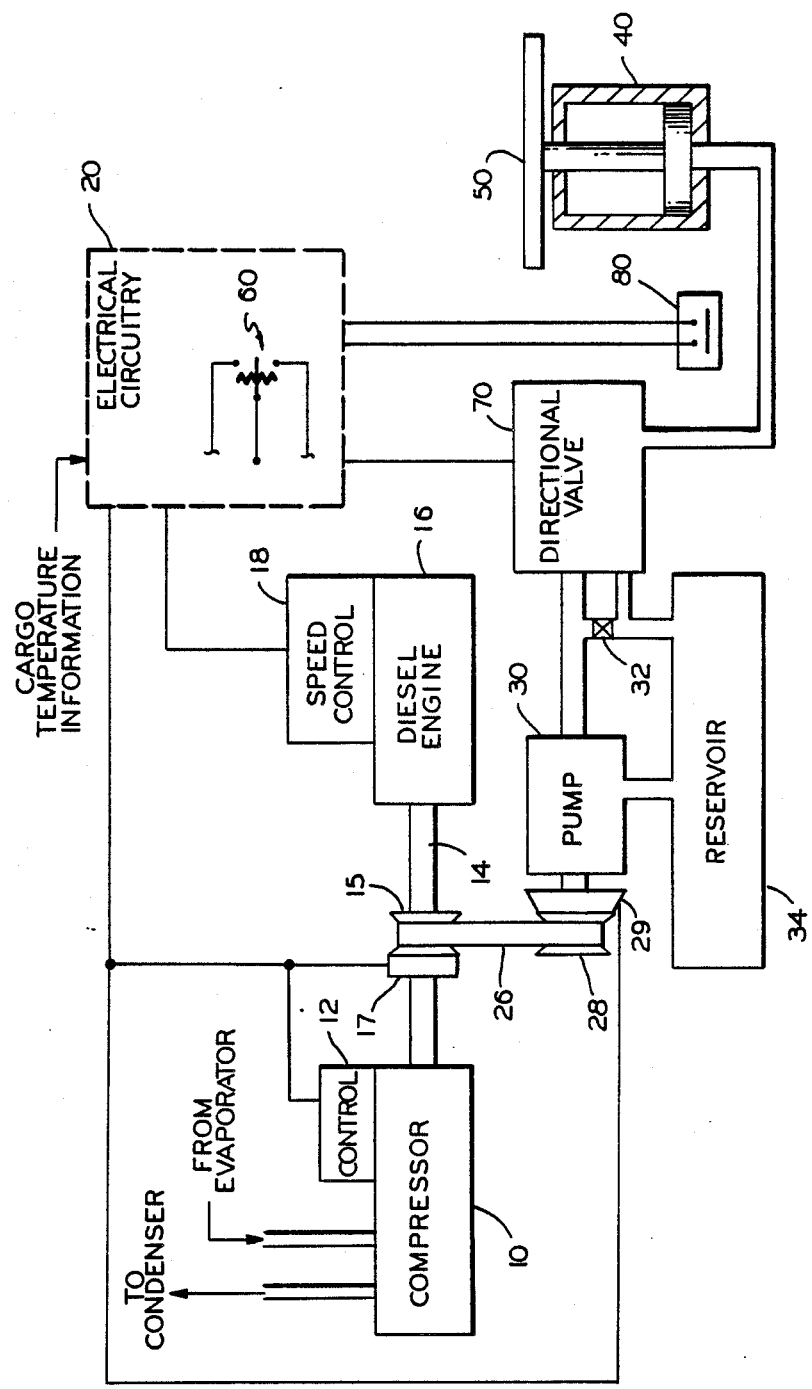
FIG. 1 is a schematic representation of a combined refrigeration and hydraulic power system.

In FIG. 1 the numeral 10 designates the compressor of a transport refrigeration system which is either driven through a clutch 17, as illustrated, or is directly driven by diesel engine 16. The compressor 10 and diesel engine 16 are under the control of electrical circuitry 20, as is conventional, which receives temperature information from the cargo space and responsive thereto controls the diesel engine 16 via diesel engine speed control 18. Electrical circuitry 20 can include a number of known features such as the refrigeration system control details, an automatic start/stop system and the structure for switching over to line power which form no part of the present invention and therefore have not been described or illustrated for reasons of clarity and brevity. Compressor 10 is driven as long as the diesel engine 16 is operating and cargo temperature requirements are unmet. When temperature requirements are met in the cargo space, in addition to slowing the diesel engine 16, electrical circuitry 20 causes the disengagement of clutch 17, if present, and/or the unloading of compressor 10 via unloader control 12 to achieve unloading of compressor 10. The foregoing description generally applies to transport refrigeration units. While the cargo has very specific temperature requirements, it is possible to maintain the cargo temperature within suitable limits if the refrigeration system is disabled for a limited period of time.

The present invention connects hydraulic pump 30 via electrical/centrifugal clutch 29, sheave 28 and belt 26 to the sheave 15 which is driven by shaft 14 of diesel engine 16. As a result, pump 30, like compressor 10, is driven whenever diesel engine 16 is operated if the corresponding clutch 29 is engaged. In the case where clutch 29 is a centrifugal clutch, engagement is responsive to engine speed as controlled by speed control 18. Hydraulic pump 30 provides high pressure hydraulic fluid to hydraulic cylinder 40 for raising or extending lift gate of platform 50 under the control of electrical circuitry 20 via directional valve 70 responsive to manual switch 60. Preferably, normally open pressure actuated switch 80 is connected to the electrical circuitry 20 and is closed responsive to the pressure supplied to hydraulic cylinder 40 and thereby provides a signal to circuit 20 that cylinder 40 is pressurized as well as providing a parallel circuit for switch 60.

Figure 2:
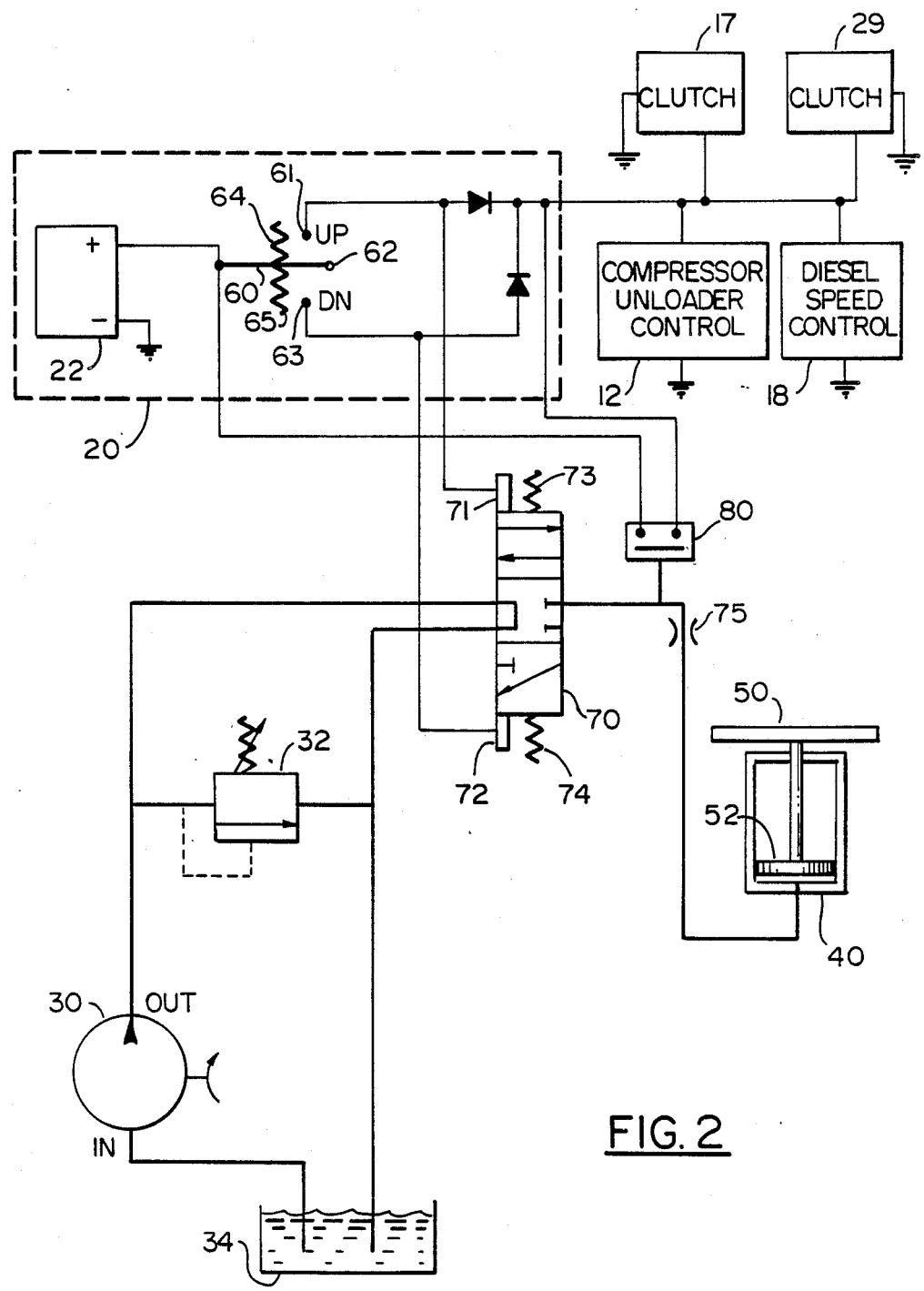
FIG. 2 is a schematic representation of the hydraulic power system in the unloaded or idle mode.

Referring now to FIG. 2, it will be note that manual switch 60 has three positions and that each of them corresponds to a position of directional valve 70 and to a function of the hydraulic cylinder 40 and lift gate or platform 50. In FIG. 2, manual switch 60 is in the idle or unloaded position engaging terminal or contact 62 and directional valve 70 is in its central or neutral position so that if pump 30 is actuated, the hydraulic fluid passes through directional valve 70 and returns to reservoir 34. Switch 60 is normally held in engagement with terminal or contact 62 due to the bias of springs 64 and 65. Other than the fact that pump 30, if operating, is being run in an unloaded fashion the refrigeration unit is run responsive to cargo requirements under the control of electrical circuitry 20. More specifically, the diesel engine 16 is controlled through speed control 18 and compressor 10 is regulated through clutch 17 and/or compressor unloader control 12. If it is desirable to raise or move the gate or platform 50, manual switch 60 is moved against the bias of spring 64 into engagement with terminal or contact 61. The operator must hold switch 60 in engagement with contact or terminal 61 otherwise springs 64 and 65 will return switch 60 to the FIG. 2 position. It will be noted that when manual switch 60 engages terminal or contact 61 a power source represented by the refrigeration system battery 22 is connected to electrical circuitry 20 and thereby provides power to compressor unloader controller 12 and to the diesel engine speed control 1B to speed up diesel 16 so that, if present, centrifugal clutch 29 will thereby be engaged to pump 30. If clutch 29 is operated by electrical means, power would be supplied by system battery 22 at this time. If there is an unsatisfied refrigeration demand and diesel 16 is unable to meet this demand and to drive pump 30, compressor 10 will be unloaded through clutch 17 and/or compressor unloader control 12. Battery 22 also provides power to solenoid 71 of directional valve 70 to cause directional valve 70 to shift downwardly from the illustrated portion against the bias of center return spring 74. The high pressure hydraulic fluid supplied by pump 30 is thereby directed through directional valve 70 via flow controller 75 to hydraulic cylinder 40 where it acts on piston 52 to cause lift gate or platform 50 to be raised or otherwise moved. Flow controller 75 controls the rate of flow to and from hydraulic cylinder 40 to thereby control the rate of movement of lift gate or platform. Flow controller 75 is downstream of normally open pressure actuated switch 80. When pump 30 is supplying high pressure hydraulic fluid to cylinder 40, the high pressure hydraulic fluid supplied to cylinder 40 will also act on and thereby close the contacts of pressure actuated switch 80, if present, to thereby complete a second electrical circuit to the electrical circuitry 20. The control logic of electrical circuitry 20 would determine, based on refrigeration system demands, whether or not to engage clutch 17 and compressor unloader control 12. When lift gate or platform 50 has been fully raised or moved or if pump 30 is otherwise pumping hydraulic fluid in excess of requirements, high pressure relief valve 32 causes the bypassing of excess hydraulic fluid to reservoir 34. If diesel engine 16 can supply sufficient power, compressor 10 will be run responsive to refrigeration system demands otherwise, as long as manual switch 60 engages terminal or contact 61, the compressor 10 and therefore the refrigeration system will be disabled due to the unloading of compressor 10 by compressor unloader control 12 and/or clutch 17. When manual switch 60 is allowed to return to the idle or unloaded position of FIG. 2 while lift gate or platform 50 is raised, the hydraulic fluid is trapped between directional valve 70 and hydraulic cylinder 40, thus allowing lift gate or platform 50 to remain in its raised or moved position indefinitely while electrical circuitry 20 is fully responsive to cargo refrigeration requirements.

When the lift gate or platform 50 is to be lowered, manual switch 60 is moved against the bias of spring 65 into engagement with contact or terminal 63 to provide power to electric solenoid 72 to cause directional valve 70 to shift upwardly from the illustrated position against the bias of center return spring 73. The operator must hold switch 60 in engagement with contact or terminal 63 otherwise springs 64 and 65 will return switch 60 to the FIG. 2 position. With manual switch 60 engaging terminal 63, electrical circuitry 20 and thereby compressor unloader control 12, clutch 17, if present, and diesel engine speed control 18 are provided power to unload the compressor 10, if required, and to cause diesel engine 16 to run at a predetermined speed. If clutch 29 is operated by electrical means, power would be supplied by system battery 22 at this time. The output of pump 30 is blocked by directional valve 70 and high pressure relief valve 32 bypasses the output of pump 30 back to reservoir 34. The low pressure fluid downstream of flow controller 75, which controls the flow from hydraulic cylinder 40 to reservoir 34 via directional valve 70, acts on switch 80 to permit opening of the contacts and the disconnecting of the electrical circuit to the electrical circuitry 20. The control logic of electrical circuitry 20 would determine, based on refrigeration system demands, whether or not to engage clutch 17 and/or compressor unloader control 12.

If, during lowering or raising, lift gate or platform 50 is required to stop at any intermediate position, manual switch 60 is allowed to engage terminal or contact 62, the FIG. 2 position, whenever the platform 50 reaches the desired elevation. With switch 60 in the FIG. 2 position, valve 70 returns to the FIG. 2 position. This would permit the compressor 10 to be again controlled responsive to refrigeration system requirements if it has been unloaded in order to provide hydraulic power.

Figure 3:
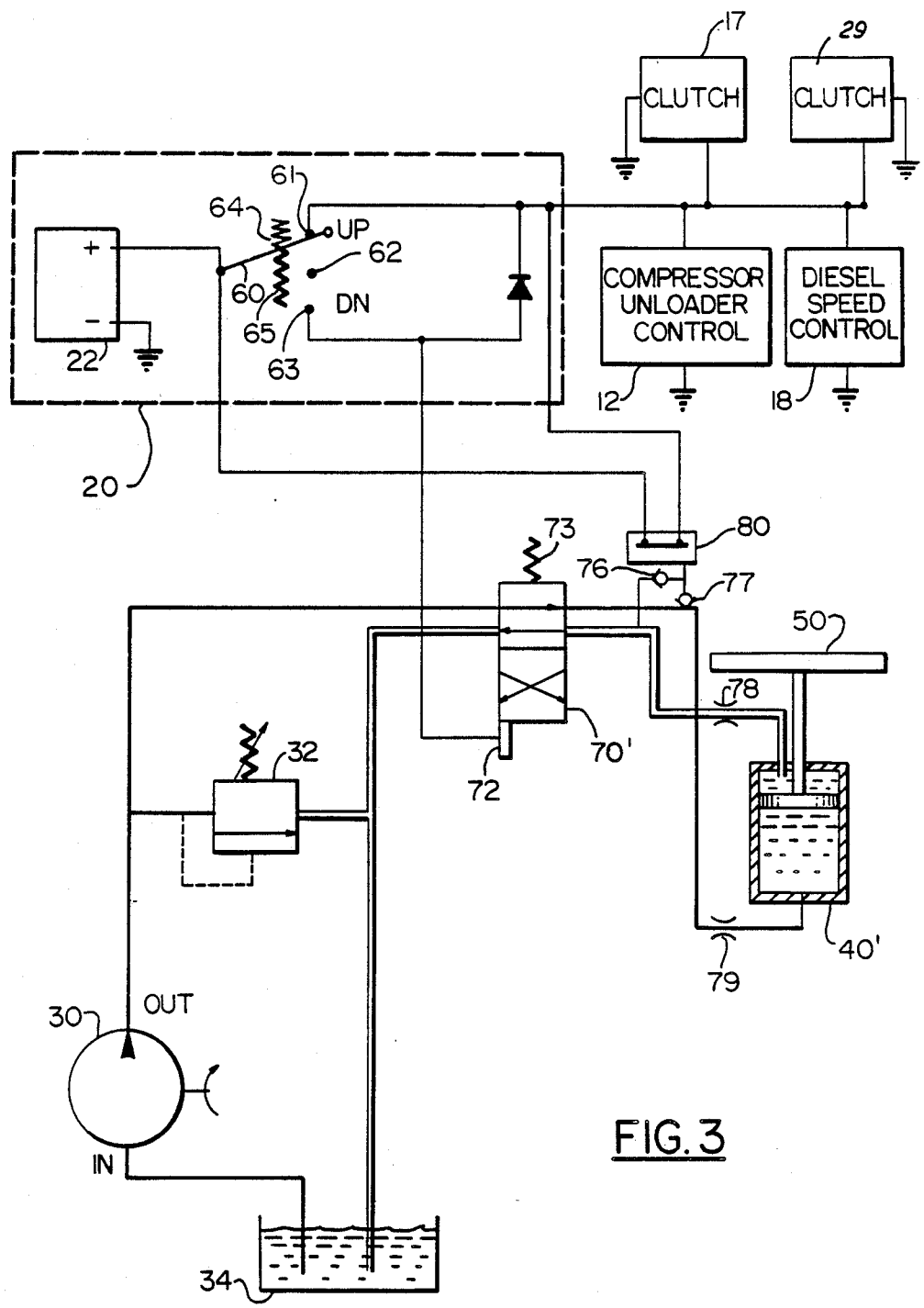
FIG. 3 is a schematic representation of a modified hydraulic power system.

FIG. 3 illustrates a modified hydraulic power system which is essentially identical to the embodiment of FIGS. 1 and 2 except for the power cylinder 40, which is now powered in both directions, directional valve 70' which has only two positions and is acted on by a single solenoid 72 and single spring 73, the flow control structure and the connections between switch 60 and valve 70, and switch 80. This embodiment is particularly suited for use with a lift gate or platform 50 which does not have a gravity down position as where the platform 50 moves in a horizontal plane. Because valve 70' has only two positions and each position supplies power to one side of power cylinder 40', this embodiment has an unpowered or neutral status only if the clutch 29 is not engaged. Further, each position of valve 70' connects one side of cylinder 40' to sump 34. As illustrated in FIG. 3, valve 70' is in its normal or up position and the moving of switch 60 into engagement with contact 61 only serves to complete an electrical circuit to the speed control 18 so that diesel engine speed can be increased to cause clutch 29 to engage and permit the driving of pump 30. If clutch 29 is operated by electrical means, power would be supplied by system battery 22 at this time. It should be noted that a second electrical circuit between battery 22 and speed control 18 is established by the closing of pressure actuated switch 80. It should be noted that switch 80 is connected via check valve 76 to one line and via check valve 77 to the other line so that the highest pressure is supplied to switch 80. Valves 76 and 77 have controlled leakage to prevent the trapping of pressurized fluid. Flow controllers 78 and 79 control the rate of the filling and exhausting of both sides of the cylinder 40'. When switch 60 is moved into engagement with contact 63, in addition to completing an electrical circuit to diesel speed control 18, power is supplied to solenoid valve 70' causing valve 70' to shift upwardly, as illustrated, against the bias of spring 73 whereby the hydraulic connections to cylinder 40' are reversed to achieve an opposite direction of movement of platform or gate 50.

From the foregoing description, it should be clear that the present invention integrates a hydraulic system into a transport refrigeration unit and thereby eliminates the need for an auxiliary power source. Further, the compressor unloader control or clutch and the diesel engine speed control are connected to the hydraulic system clutch such that the refrigeration system is allowed to operate responsive to cargo refrigeration needs as long as the diesel is able to simultaneously supply the hydraulic system which has priority. If the diesel cannot provide sufficient power to meet all of the needs, the compressor is unloaded and/or declutched.

Although preferred embodiments of the present invention have been illustrated and described, other modifications will occur to those skilled in the art. For example, although the present invention has been described in terms of a diesel powered system, it is equally applicable to a dual powered unit when operating on line power where the compressor is unloaded, if necessary, to permit power to be supplied to the hydraulic system just as when operating under diesel power. Clutch 17 and compressor unloader control 12 can be considered redundant so that one can be eliminated if desired. Clutch 29 can be either a centrifugal or electrically operated clutch. It is therefore intended that the present invention is to be limited only by the scope of the appended claims.

What is claimed is:

1. A refrigeration unit and hydraulic power system comprising:
    diesel engine means including speed control means;
    compressor means connected to said diesel engine means so as to be driven thereby and including unloading means;
    hydraulic pump means having an inlet and an outlet;
    clutch means connecting said pump means to said diesel engine means so as to permit said pump means to be driven thereby responsive to the speed of said diesel engine means;
    a reservoir containing hydraulic fluid connected to said inlet for supplying hydraulic fluid to said pump means;
    platform means;
    hydraulic means for moving and returning said platform means;
    valve means having a first port connected to said outlet, a second port connected to said hydraulic means and a third port connected to said reservoir;
    electrical circuitry connected to said clutch means, said unloading means, said speed control means and said valve means and including a switch means having a first position in which said valve means is in a first position which connects said first and second ports whereby hydraulic fluid is supplied to said hydraulic means for moving said platform means and said switch means having a second position in which said valve means is in a second position which connects said second and third ports whereby said hydraulic means is connected to said reservoir for returning said platform means; and
    means for causing said unloading means to unload said compressor means when required for said diesel engine means to provide sufficient power to said hydraulic pump means.

2. The refrigeration unit and hydraulic power system of claim 1 wherein said means for causing said unloading means to unload includes a normally open pressure responsive switch.

3. The refrigeration unit and hydraulic power system of claim 1 wherein said valve means includes a fourth port connected to said hydraulic means with said third and fourth ports being connected when said switch means is in said first position and said first and fourth ports being connected when said switch means is in said second position.

4. A refrigeration unit and hydraulic power system comprising:
    driving means including speed control means;
    compressor means connected to said driving means so as to be driven thereby and including unloading means;
    hydraulic pump means having an inlet and an outlet;
    clutch means connecting said pump means to said driving means;
    a reservoir containing hydraulic fluid connected to said inlet for supplying hydraulic fluid to said pump means;
    platform means;
    hydraulic means for moving and returning said platform means;
    valve means having a first port connected to said outlet, a second port connected to said hydraulic means and a third port connected to said reservoir;
    electrical circuitry connected to said clutch means, said unloading means, said speed control means and said valve means and including a switch means having a first position in which said valve means is in a first position which connects said first and second ports whereby hydraulic fluid is supplied to said hydraulic means for moving said platform means and said switch means having a second position in which said valve means is in a second position which connects said second and third ports whereby said hydraulic means is connected to said reservoir for returning said platform means; and
    means for causing said unloading means to unload said compressor means when required for said driving means to provide sufficient power to said hydraulic means.

5. The refrigeration unit and hydraulic power system of claim 4 wherein said means for causing said unloading means to unload include a normally open pressure responsive switch.

6. The refrigeration unit and hydraulic power system of claim 4 wherein said valve means includes a fourth port connected to said hydraulic means with said third and fourth ports being connected when said switch means is in said first position and said first and fourth ports being connected when said switch means is in said second position.

7. The refrigeration unit and hydraulic power system of claim 4 wherein said clutch means includes a centrifugal clutch so as to permit said pump means to be driven thereby responsive to the speed of said driving means.

* * * * *